UNITED STATES PATENT OFFICE.

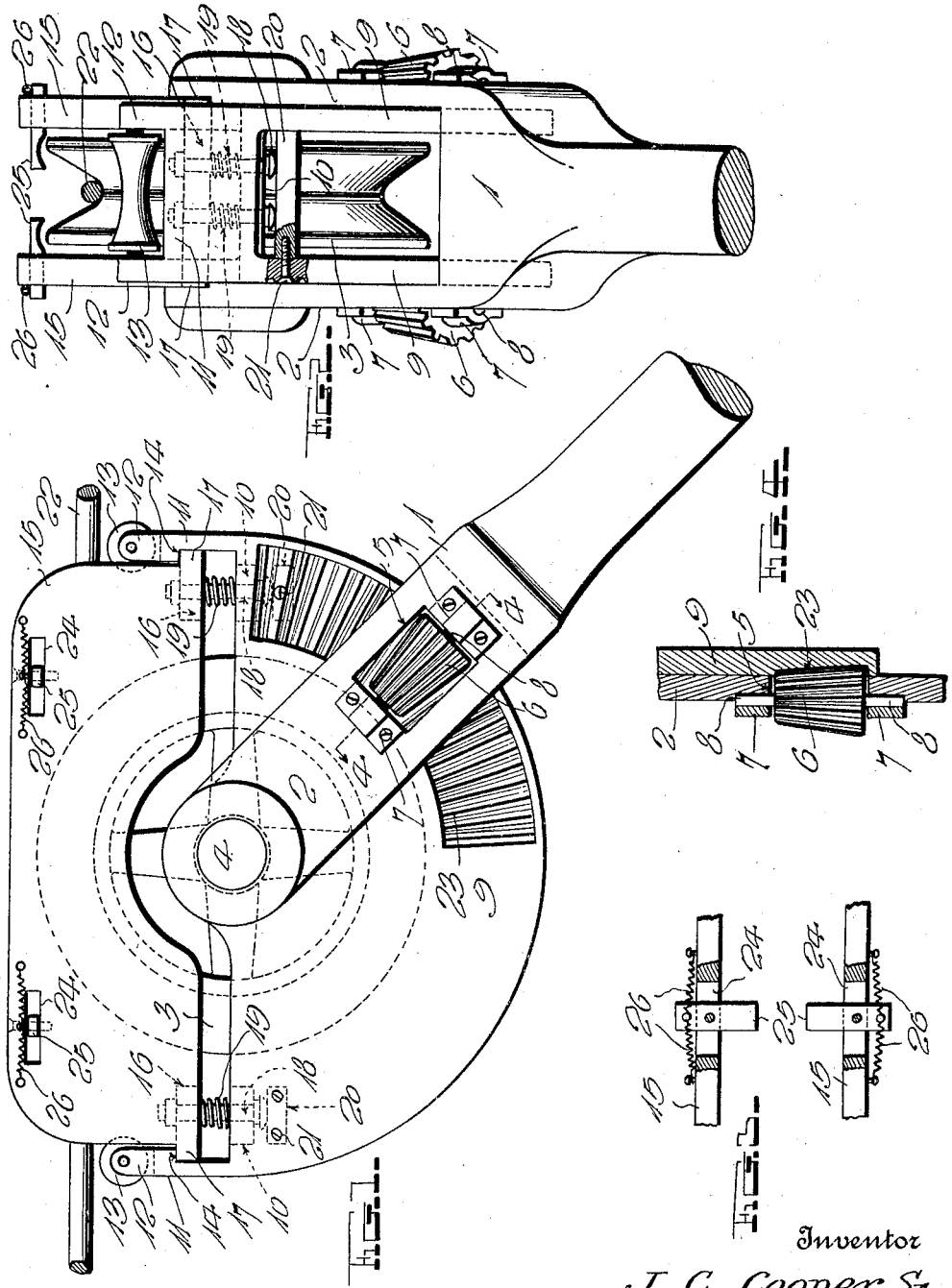

JAMES C. COOPER, SR., OF ALTOONA, PENNSYLVANIA, ASSIGNOR OF ONE-HALF TO HARRY M. WHARTON, OF ALTOONA, PENNSYLVANIA.

TROLLEY-HARP ATTACHMENT.

1,400,476.    Specification of Letters Patent.    Patented Dec. 13, 1921.

Application filed September 1, 1921. Serial No. 497,558.

*To all whom it may concern:*

Be it known that I, JAMES C. COOPER, Sr., a citizen of the United States, residing at Altoona, in the county of Blair and State of Pennsylvania, have invented certain new and useful Improvements in Trolley-Harp Attachments; and I do declare the following to be a full, clear, and exact description of the invention, such as will enable others skilled in the art to which it appertains to make and use the same.

This invention relates to an improved attachment for use in connection with a trolley harp and one object of the invention is to provide a device which is so constructed that it may be loosely mounted upon the trolley wheel axle and serve to retain the trolley wheel in engagement with a trolley wire.

Another object of the invention is to provide a device having an upper portion which is slidably mounted for vertical movement and yieldably held in a raised position thus permitting this upper portion to be moved downwardly when engaging a cross wire or other support for the trolley wire.

Another object of the invention is to so mount and secure the removable upper portion of this attachment that it can only be put in place or removed by a transverse sliding movement thus preventing it from accidentally slipping out of place when in use.

Another object of the invention is to provide means for preventing the trolley wheel from leaving the trolley wire when turning a curve.

Another object of the invention is to provide a structure which will permit the attachment to remain in a horizontal position when a car is traveling along a level stretch of track and to permit this device to tilt and thus remain parallel to the trolley wire when necessary.

Another object of the invention is to provide a structure in which the device will be prevented from having excessive swinging and thus prevented from having undue rocking movement.

This invention is illustrated in the accompanying drawings, wherein:

Figure 1 is a view showing the trolley harp and attachment in side elevation.

Fig. 2 is a view showing the structure of Fig. 1 in end elevation.

Fig. 3 is a fragmentary view partially in top plan and partially in section and showing the mounting of the stop which prevents the trolley wire from leaving the trolley wheel when a car is turning a curve.

Fig. 4 is a fragmentary sectional view taken along the line 4—4 of Fig. 1.

This device is to be used in connection with the harp 1 of a trolley pole. This harp is provided with the usual side arms 2 between which the trolley wheel 3 is rotatably mounted by means of a shaft or axle 4. An opening 5 is formed in each of the arms 2 and gears or pinions 6 are positioned in these openings 5 and rotatably mounted by means of bearings 7 positioned at opposite ends of these openings, and receiving the pivot pins 8 of the pinions. It should be noted that these pinions are tapered as shown in Fig. 1 so that the teeth of these pinions may properly engage racks as will be hereinafter brought out.

The attachment is in the form of a frame having a lower portion and an upper portion, the lower portion of the frame being suspended from the axle 4 and the upper portion being carried by the lower portion and as previously stated slidably mounted for vertical movement and yieldably held in the raised position. The lower portion of this frame is provided with side walls in the form of semi-circular disks 9 which are provided with opposed openings to receive the axle or shaft 4 and thus permit the lower section of the frame to be suspended from this axle for free swinging movement. The side disks are connected at their ends by cross strips 10 and head-boards 11 extend upwardly from the ends of this lower frame section and are provided with bearings 12 at their upper ends between which will be rotatably mounted the rollers 13. The heads 11 have their upper end portions thickened inwardly thus providing abutment shoulders 14 so that the upper section of the frame may be limited in its upward movement.

The upper section of the frame is provided with side walls 15 which are connected at their ends by cross bars 16 and are provided with end lugs 17 to engage the abutments 14. Alined openings are formed in the cross bars 10 and 16 and securing bolts are passed upwardly through these cross bars and through springs 19 which are positioned between the two cross-bars. When the securing nuts of these bolts are tightened, the springs will be compressed and the upper section of the frame will thus be normally held in a raised position. It is desired to prevent the bolts from dropping out of place and therefore there has been provided guard strips 20 which extend between the walls 9 of the lower frame section and are releasably secured by the screws 21. It will be readily seen that with these strips 20 in place, the bolts 18 cannot drop out of the openings in the cross-bars 10 and 16.

When assembling this device in connection with the trolley harp and wheel, the upper section of the frame is first placed in engagement with the lower section by slipping it transversely into place with the lugs 17 extending beneath the shoulders 14. The springs 19 are then placed between the cross-bars 10 and 16 and the bolts 18 are passed up through the cross-bars and springs and the securing nuts screwed upon the upper ends of these bolts. The blocks 20 are then put in place and secured by the screws 21 and the bolts will be prevented from dropping out of place. The frame will then be placed between the arms of the trolley harp and after the trolley wheel has been placed within the frame, the axle 4 will be put in place and secured. It will thus be seen that the frame will be supported upon the axle upon opposite sides of the trolley wheel and this frame will of its own weight normally hang horizontally. When the trolley wire is engaged by the trolley wheel, the trolley pole may assume the usual angle. When going down hill or across uneven places in a track, the trolley wheel remains in engagement with the wire and when the trolley wire strikes the rollers 13, the same will be tilted and caused to assume the proper position in case it should not of itself move to the horizontal position. It is desired to prevent this frame from having undue swinging movement and therefore the side walls 9 have been provided with racks 23 which mesh with the teeth of the gears 6. By having these gears or pinions meshing with the racks, they will serve to prevent undue swinging movement of the frame, this being due to the fact that the gears or pinions have frictional engagement with the teeth of the racks and thus provide greater frictional binding than would be created between the smooth rollers and a plane surface. In addition to preventing excessive swinging of the frame the gears or pinions further serve as rollers holding the frame out of engagement with the side arms of the harp. It is further desired to prevent danger of the trolley wheel leaving the trolley wire when the car is making a turn and therefore the side walls 15 of the upper section of the frame have been provided with oppositely disposed slots 24 in which are pivotally mounted the abutment strips 25. These abutment strips 25 will serve to engage the trolley wire in case it attempts to twist diagonally out of engagement with the wheel and the wire will thus be at all times engaged by the trolley wheel. These abutment strips 25 are yieldably held in the position shown in Fig. 3 by the springs 26 so that when splices or other obstructions are encountered, these arms may give and thus be prevented from being broken. It should be further noted that the ends of the side walls 15 of the upper frame section are curved as shown clearly in Fig. 1 so that when crossed wires which support the trolley wire are encountered, the upper section of the frame may be easily moved downwardly to pass beneath these crossed wires without any danger of the upper section of the frame catching upon these supporting wires. There has thus been provided a trolley harp attachment which will be very effective in operation and will not be liable to come apart or get out of order when in use.

I claim:

1. The combination with a trolley pole harp, a trolley wheel and an axle supporting the wheel between the arms of the harp, of a frame having a lower section having side walls loosely suspended from said axle between said wheel and the arms of said harp, an upper frame section having side walls upon opposite sides of said wheel, coöperating means carried by said frame sections for limiting upward movement of the upper section, cross bars carried by the side walls of said frame sections, bolts extending upwardly through said cross bars, springs upon said bolts between said cross bars to yieldably retain the upper frame section in a raised position, and blocks releasably secured between the walls of the lower frame section and beneath the cross bars thereof to support the bolts against accidental displacement.

2. The combination with a trolley pole harp, a trolley wheel and an axle rotatably mounting the wheel between the arms of said harp, of a frame comprising a lower section having side walls positioned between the wheel and arms of the harp and loosely suspended from said axle, cross bars connecting said walls at the upper corners thereof, head boards extending above the upper corners of said frame and having inwardly extending shoulders, an upper frame section having side walls extending upon opposite sides of said wheel and having end lugs extending beneath said shoulders, cross bars connecting the end portions of the side walls of said upper frame section, securing bolts passing upwardly through the cross bars of the frame sections, springs upon said bolts between the cross bars to yieldably support the upper frame section with the lugs engaging the shoulders, and blocks removably secured beneath the cross bars of the lower frame section to prevent accidental displacement of the bolts.

3. The combination with a trolley pole harp, a trolley wheel and an axle supporting the wheel between the arms of the harp, of a frame having a lower section having side walls loosely suspended from said axle between said wheel and the arms of said harp, an upper frame section having side walls upon opposite sides of said wheel, coöperating means carried by said frame sections for limiting upward movement of the upper section, and means for yieldably retaining the upper frame section in a raised position, the walls of the upper section having their end portions curved at the upper corners to provide cam faces causing downward movement of the upper section upon striking an obstruction.

4. The combination with a trolley pole harp having arms, a trolley wheel and an axle rotatably supporting the wheel between the arms of said harp, of a frame having a lower section provided with side walls loosely mounted upon said axle upon opposite sides of said wheel, an upper frame section moved transversely into position above the lower section with the wheel removed and having limited upward movement when in place, and means for yieldably retaining the upper frame section in an elevated position.

5. The combination with a trolley pole harp having arms provided with openings, a trolley wheel, and an axle rotatably supporting the wheel between the arms of said harp, of a frame having side walls loosely mounted upon said axle upon opposite sides of said wheel and having arcuate racks, and pinions carried by the arms of said harp and extending through the openings thereof and meshing with the teeth of said racks.

In testimony whereof I have hereunto set my hand.

JAMES C. COOPER, Sr.